United States Patent [19]

Fujita

[11] 4,398,245
[45] Aug. 9, 1983

[54] DATA PROCESSING SYSTEM HAVING AN INSTRUCTION PIPELINE FOR PROCESSING A TRANSFER INSTRUCTION

[75] Inventor: Akira Fujita, Hadano, Japan
[73] Assignee: Hitachi, Ltd., Tokyo, Japan
[21] Appl. No.: 172,181
[22] Filed: Jul. 25, 1980

[30] Foreign Application Priority Data

Jul. 27, 1979 [JP] Japan .................................. 54-95927

[51] Int. Cl.³ .............................................. G06F 9/38
[52] U.S. Cl. ................................................. 364/200
[58] Field of Search .................... 364/200 MS File

[56] References Cited

U.S. PATENT DOCUMENTS 3,840,861 10/1974 Amdahl et al. ..................... 364/200
3,988,719 10/1976 Whitby et al. ..................... 364/200
4,149,244 4/1979 Anderson et al. .................. 364/200

Primary Examiner—Raulfe B. Zache
Attorney, Agent, or Firm—Antonelli, Terry & Wands

[57] ABSTRACT

A transfer instruction to be executed by a data processor includes a first operand representing a transfer-in address and a second operand representing a transfer-out address. Since the number of bytes transferred at a time is determined by a particular data processor used, a plurality of number of transfers are required to transfer the total data bytes, and first and second operand addresses must be calculated for each transfer. In a pipeline controlled data processor in the present invention, a circuit for calculating the first operand address is separately provided and this circuit is utilized in the first operand address calculation for second and subsequent data transfer operation so that the address calculation step is completed in one cycle of the pipeline control.

13 Claims, 22 Drawing Figures

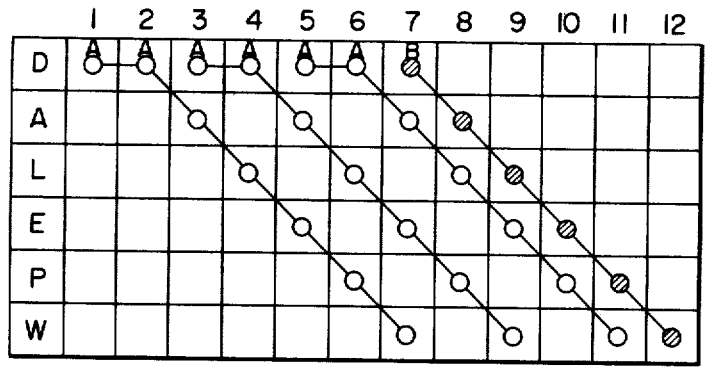
FIG. 7a
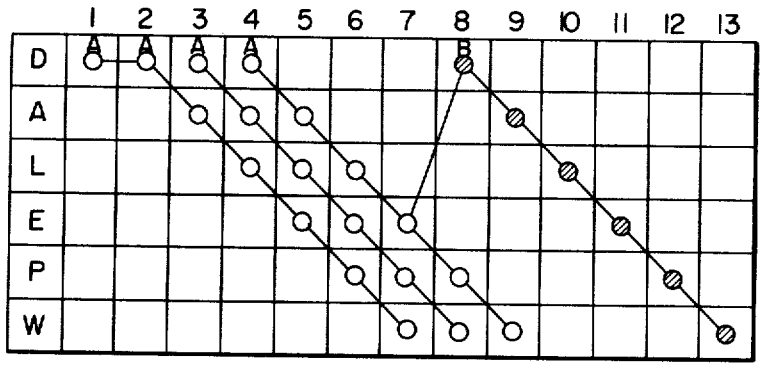
FIG. 7b
FIG. 11
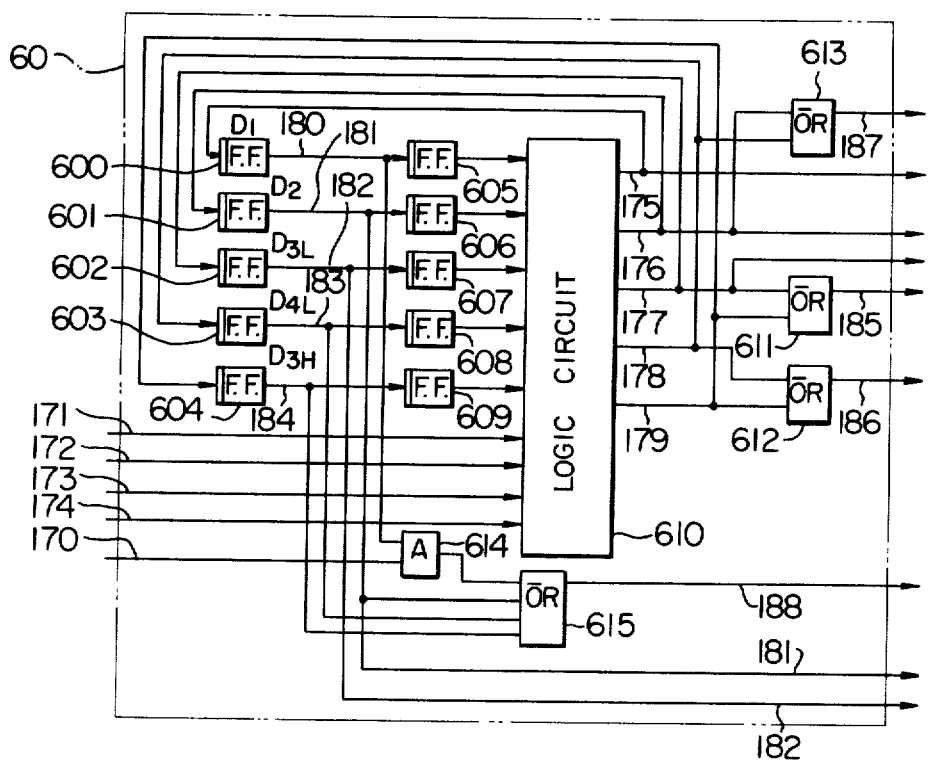

DATA PROCESSING SYSTEM HAVING AN INSTRUCTION PIPELINE FOR PROCESSING A TRANSFER INSTRUCTION

BACKGROUND OF THE INVENTION

1. Field of the Invention

The present invention relates to an operand fetch in a data processing system having an instruction pipeline, and more particularly to a data processing system adaptable to high speed processing of a transfer instruction for storing the content of a storage location specified by a second operand in an instruction to a storage location specified by a first operand in the instruction.

2. Description of the Prior Art

In a data processing system, a technique calld instruction pipeline has been adopted in order to attain a high speed execution of instructions. This technique is shown and described in the U.S. Pat. Nos. 3,840,861 and 4,149,244 and is well known in recent computer technology. It, therefore, need not be explained in detail herein. Briefly speaking, the instructions are executed through the steps of calculating an operand address (step D), translating the address and table-looking up a buffer storage (step A), reading out an operand (step L), carrying out an arithmetic operation (step E), transferring store data to a storage control unit (step P) and writing data into a storage (step W). The processor has hardware corresponding to the respective steps. In this system, while the step W for a given instruction is being executed in the hardware for executing the step W, the step P for the next instruction can be simultaneously executed in the hardware for executing the step P. Accordingly, six instructions may be executed simultaneously, but in different steps. The system in which a plurality of instructions can be parallelly executed is called a pipeline system. When a data transfer instruction is to be executed in a pipeline-type processor, the step for calculation of an operand address takes twice as long a time as the time required for the other steps, that is, it takes two cycles. As a result, the hardware for the other steps which require one cycle for operation are idling for the following one cycle. During this period, the hardware for the other steps show an operation rate or factor of only 50%. More specifically, a transfer instruction includes an operation field for specifying the transfer operation, an L-field for indicating a total number of bytes to be transferred, a first operand field and a second operand field. It instructs that those bytes which are one byte more in number than the number specified by the L-field are to be transferred from the storage address indicated by the second operand field to storage addresses starting from the address indicated by the first operand field. The first and second operand fields each have a base register allocation section and a displacement section, and the address is calculated by adding the content of an allocated base register to the displacement value. One cycle is needed for the address calculation of the first operand and another cycle is needed for the address calculation of the second operand. Eight bytes are transferred at a time. When a total of 32 bytes are to be transferred, the transfer operation must be repeated four times. For the second and subsequent transfers, the sequentially increasing addresses which are 8 higher, 16 higher and so on than the storage address specified by the instruction are also calculated. This calculation also takes one cycle for each of the first and second operand addresses. Accordingly, in the example shown above, the operation factor is 50% during the eight cycles. This means that the speed of the instruction execution decreases to one half during this period.

SUMMARY OF THE INVENTION

It is an object of the present invention to execute instructions at a high speed, and more particularly to enhance the performance of the processor by reducing the time required for the calculation of the operand addresses to thereby reduce the idling time of the execution functions for other steps.

In accordance with the present invention, an "add 8" circuit is provided (assuming that eight bytes are transferred at a time) in addition to the conventional operand address calculation functions. The first calculation for the first and second operand addresses is calculated in two cycles as is done in the prior art but the second and subsequent calculations for the operand addresses are carried out by the conventional calculation function for one operand while the other operand address is calculated by the additional adder circuit so that the data transfer is carried out once for each cycle of the operand address calculation steps of the instruction pipeline.

BRIEF DESCRIPTION OF THE DRAWINGS

FIG. 4a shows a time chart for a pipelined control for a general instruction.

FIGS. 4b, 5a and 5b show time charts for a pipelined control for a transfer instruction.

FIGS. 6a, 6b, 7a and 7b show time charts for illustrating the execution of the transfer instruction.

FIG. 11 shows detail of an instruction control unit shown in FIG. 10.

DETAILED DESCRIPTION OF THE PREFERRED EMBODIMENTS

Figure 1A:
FIGS. 1a, 1b and 1c show instruction formats.
Figure 1B:
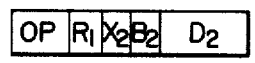
Figure 1C:
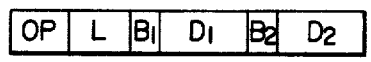

There are many instruction formats for an information handling system. Typical examples of such instruction formats are shown in FIGS. 1a to 1c, in which an operation code field (OP) is used to identify a specific operation to be carried out. An $R_1$ field shown in FIGS. 1a and 1b contains the number of a general purpose register or a floating decimal point register in the processor. The content of the corresponding general purpose register or the floating decimal point register is used as a first operand. An $R_2$ field shown in FIG. 1a contains the number of a general purpose register or a floating decimal point register in the same manner as the $R_1$ field does. The content of the general purpose register or the floating point register specified by the $R_2$ field is used as a second operand. In FIG. 1b, the $X_2$ field and $B_2$ field contain the respective numbers of general purpose registers. The sum of the contents of the corresponding general purpose registers and a value contained in a $D_2$ field, i.e. $\{(X_2)+(B_2)30\ D_2\}$ indicates an address in the storage and the data stored in that storage address is used as the second operand. In FIG. 1c, $\{(B_1)+D_1\}$ and $\{(B_2)+D_2\}$ indicate addresses in the storage, and the data stored at those storage addresses are used as the first operand and the second operand, respectively. An L field in FIG. 1c contains length information of a storage operand necessary for execution of the process.

Figure 2:
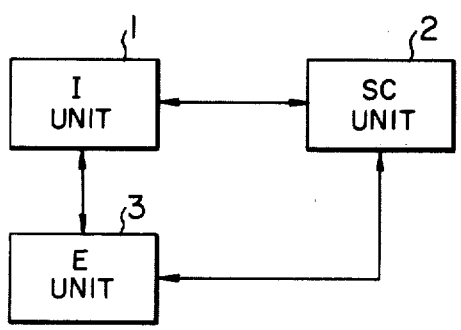
FIG. 2 shows a general configuration of a data processor to which the present invention is applied.

FIG. 2 shows a schematic configuration of an information handling system, in which numeral 1 denotes an instruction unit (I unit) for decoding an instruction, numeral 2 denotes a storage control unit (SC unit) including a storage, and numeral 3 denotes an execution unit (E unit) for executing an operand specified by the instruction. When the I unit 1 reads out the instruction from the SC unit 2, it sends data and control information necessary for the execution of the instruction to the E unit 3. If the instruction format is such that the operand necessary for the execution is a storage operand as shown in FIG. 1b, the I unit 1 carries out the calculation of $\{(B_2)+D_2\}$ and issues a request to the SC unit to cause it to send necessary data to the E unit 3. When the E unit 3 receives the control information and the data necessary for the execution of the instruction from the I unit 1 or the SC unit 2, it executes the instruction as specified and stores the result in a given register or the storage.

As is well known, in the execution of the instruction, the I unit 1 takes a longer operation time than the E unit 3 because the access time for the storage operand is longer than the execution time. In a high speed processor, the pipeline control is used to enhance the performance of the processor. The pipeline control is discussed in detail in the aforementioned U.S. Pat. Nos. 3,840,861 and 4,149,244.

In the pipelined information handling system, let us consider the instruction transfer in which bytes which are one more in number than the value contained in the L field in the instruction format shown in FIG. 1c are to be transferred from the storage address $\{(B_2)+D_2\}$ which is specified by the second operand fields ($B_2$ and $D_2$) to storage addresses subsequent to the storage address $\{(B_1)+D_1\}$ which is specified by the first operand fields ($B_1$ and $D_1$).

Figure 3:
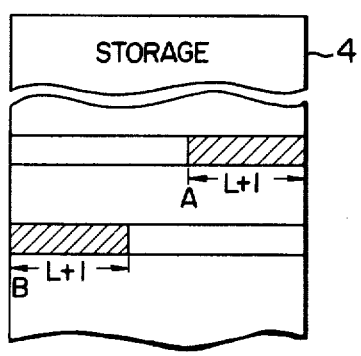
FIG. 3 illustrates the transfer operation by a transfer instruction in a storage.

FIG. 3 illustrates the instruction transfer operation for the above example and it shows that data starting from the storage address A specified by the second operand field in the instruction is transferred to the storage addresses subsequent to the storage address B specified by the first operand field. The length of data transferred is indicated by the L field. That is, those bytes which are one byte more in number than the value (L) in the L field are transferred. The L field of the instruction usually consists of eight bits so that a maximum of $2^8 = 256$ bytes can be transferred.

On the other hand, the time period from the issuance of the request from the I unit 1 to the SC unit 2 shown in FIG. 2 to the receipt of the storage operand necessary for the execution of the instruction by the E unit 3 is much longer than the execution time in an arithmetic unit in the E unit 3.

FIG. 4a shows a time chart for pipeline control for successive general instructions with an assumption that the storage request takes three times as long time as the execution time. In FIG. 4a, the abscissa represents a machine cycle of the system while the ordinate represents allocated process time of the respective units in the system. Symbol D in the ordinate indicates the operand address calculation, A indicates the address translation and table look-up of a buffer storage (BS), L indicates the readout of the operand, E indicates the execution, P indicates the transfer of the store data to the SC unit 2, and W indicates the write operation. Those symbols equally apply to FIGS. 4b, 5a and 5b.

In FIG. 4a, due to the pipeline control, an instruction a is executed in such a way that the operand address is calculated in the step D (first cycle), a request for reading out the storage address is issued to the SC unit, data is transferred to the E unit at the end of the step L (third cycle) and the instruction is executed at the step E (fourth cycle). When the result of the execution is to be stored in the storage, the data to be stored is transferred to the SC unit in the step P in the fifth cycle and it is stored in the storage at the step W in the sixth cycle. Similarly, the next instruction b is executed in the following manner; the storage operand is read out in the steps D, A, and L in the second to fourth cycles, it is executed in the step E in the fifth cycle and the result of the execution is stored in the storage in the step W in the seventh cycle.

FIG. 4b shows a time chart for a transfer instruction having an instruction format as shown in FIG. 1c. In this case, the storage address $\{(B_1)+D_1\}$ for the first operand is calculated at the step D in the first cycle and it is stored in a register in the I unit. In the step D in the second cycle, the storage address $\{(B_2)+D_2\}$ for the second operand is calculated and a request is issued to the SC unit. At the same time, the value in the L field in the instruction is decreased by the number of bytes (8 bytes in the present example) to be transferred at a time. At the step L in the fourth cycle, the data is transferred to the E unit and at the step E in the fifth cycle, the storage data is prepared for the store data and the first operand address or the store address stored in the register in the I unit is sent to the SC unit. At the step P in the sixth cycle, the store data is transferred to the SC unit and it is stored in the storage at the step W in the seventh cycle. If the value in the L field in the instruction is not larger than 7 at the step D in the second cycle, it indicates the completion of the transfer, and the instruction following the transfer instruction is read out for execution at the step D in the third cycle. If the value is larger than 7, it indicates that the transfer has not yet been completed and the following operation takes place. At the step D in the third cycle, a sum of the first operand address $\{(B_1)+D_1\}$ calculated in the step D in the first cycle and the number of bytes, i.e. "8" transferred in the first transfer is stored in the register in the I unit in preparation for the second transfer operation. At the step D in the fourth cycle, 8 is added to the second operand address $\{(B_2)+D_2\}$ calculated in the step D in the second cycle and the resultant sum is sent to the SC unit to read out the second operand from the storage. At the step W in the ninth cycle, the corresponding data is stored in the storage at the first operand address calculated in the third cycle. At the step D in the fourth cycle, "8" is subtracted from the value in the L field in the instruction. In this manner, the above operations are repeated until the value in the L field of the instruction becomes no larger than "7", when the instruction following the transfer instruction is executed in the step D.

The transfer instruction having the instruction format as shown in FIG. 1c can transfer up to 256 bytes of data. In a conventional information handling system, the data width read out of the storage in the SC unit and the data width written into the storage are 8-byte width. Accordingly, the above operations are repeated 32 times at maximum. In such a case, as shown in FIG. 4b, the system can store the data only once during two D cycles and hence the arithmetic unit and the storage are used only in every other cycle.

In order to simplify the following explanation, the following facts are assumed: In a conventional large scale information handling system, the data cannot usually be written into the storage across the 8-byte boundary (address of 8's multiple) of the storage address. If it is desired to store the 8-byte data at an address starting from address 3 of the storage, 5-byte data is first written at the addresses 3 to 7 and then the remaining 3-byte data is written at the addresses 8 to 10, requiring two write operations. For the purpose of simplicity, it is assumed here that the storage addresses into which data is to be written starts from the 8-byte boundary so that the 8-byte data can be written in one write operation. Similarly, for the read operation, it is assumed that the storage addresses from which data is to be read out starts from the 8-byte boundary so that the 8-byte data can be read out in one read operation.

FIGS. 5a through 7b show time charts which show the comparison between the systems in which the high speed processing technique of the present invention is not applied and the systems in which it is applied. The figures with suffix a are for the systems without the teaching of the present invention and the figures with suffix b are for the systems with the teaching of the present invention. Symbol A indicates a transfer instruction and symbol B indicates an instruction following the transfer instruction.

As described above, the high speed processing technique of the present invention is characterized by the provision of an additional operand address calculation function in addition to the conventional operand address calculation functions so that the operand address calculation for either one of the first and second operands is carried out by the additional calculation function to thereby complete the step D in the execution of the instruction in one cycle and make it possible to advance to the step A for that instruction. The detail of the construction will be described hereinlater. Since the transfer instruction assumes the format as shown in FIG. 1c, it is unavoidable that two cycles are needed for the operand address calculation in the first transfer according to the transfer instruction.

Figures 5A, 5B, 6A, 6B:
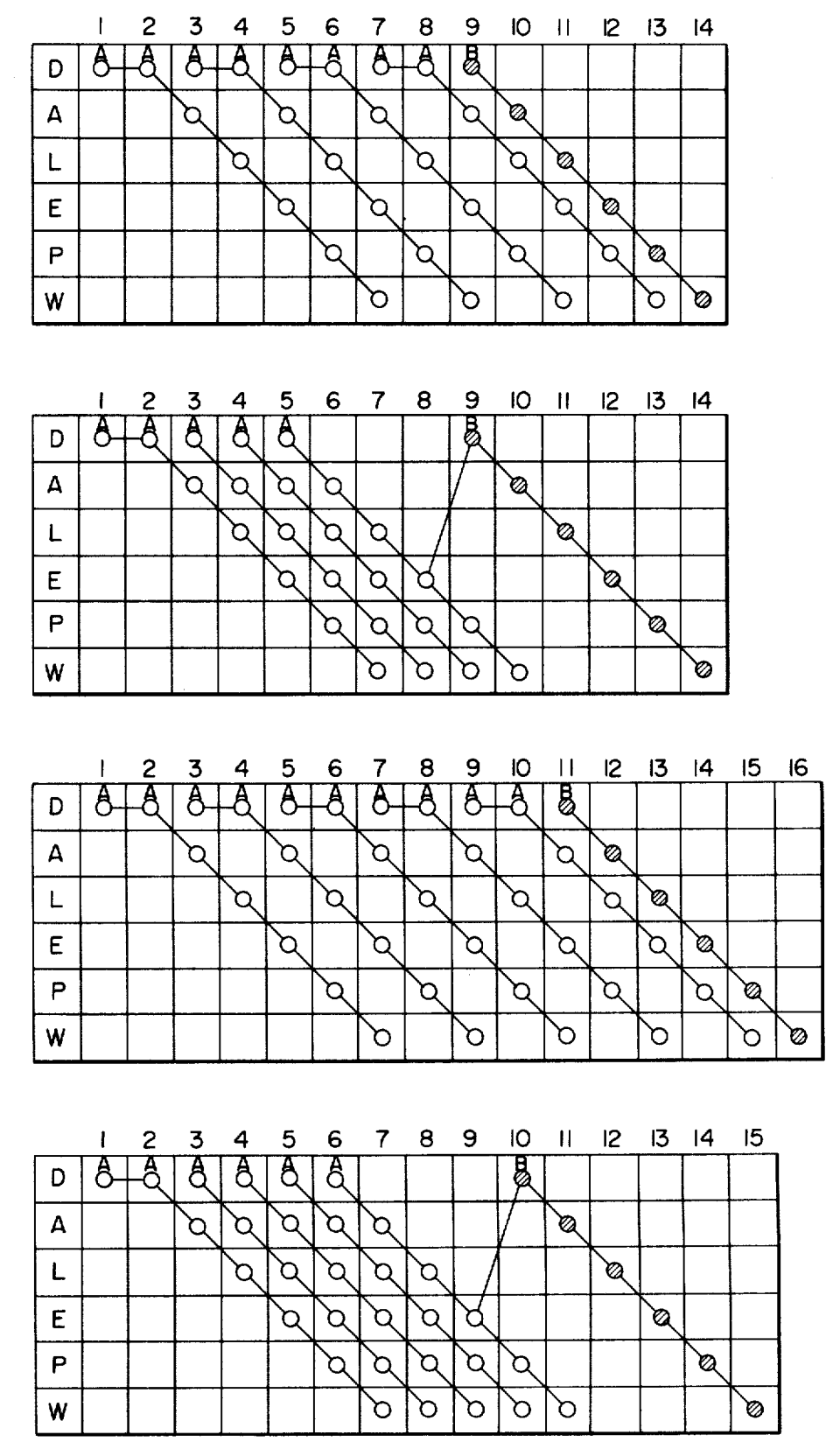

FIG. 5a shows a case where the value in the L field of the transfer instruction (the number of bytes transferred) is $24 \leq L \leq 31$. In this case, four write operations are necessary. If the performance for executing the instruction is represented by the time period from the start of the first step D for that instruction to the start of the step D for the succeeding instruction, the performance for the execution of the transfer instruction A is 8 cycles in both cases of FIG. 5a and FIG. 5b. In FIG. 5b which applies to the present invention, the step D for the instruction B following the transfer instruction A starts after the completion of the last step E for the transfer instruction A for a reason which will be described later. FIG. 6 shows a case where the value L is $32 \leq L \leq 39$. In this case, five write operations are required. The performance for the execution of the transfer instruction A in FIG. 6a in which the high speed processing technique of the present invention is not applied is 10 cycles while that in FIG. 6b in which the present invention is applied is 9 cycles, one cycle faster than in FIG. 6a. It is apparent that as the value L increases the difference between the performance in the present system and the performance in the system which does not use the present invention becomes greater. For the value 255 which is the possible maximum value for L, the write operations take place 32 times. In the prior art system, accordingly, $32 \times 2 = 64$ cycles are necessary while the present system needs $32 + 4 = 36$ cycles (where the numeral "4" indicates a delay from the step D in the sixth cycle, for example, in FIG. 6b to the step D in the tenth cycle for the instruction B following the transfer instruction A). Thus, the difference is equal to 28 cycles. FIG. 7 shows a case where the value L is $16 \leq L \leq 23$. In this case, the present system needs one more cycle than the system which does not use the present invention. Accordingly, in the most preferable embodiment of the present invention, the conventional processing method is used when the value L is not greater than 23 and the high speed processing technique as shown in FIGS. 5b and 6b is used when the value L is equal to or greater than 24. The processing in accordance with FIGS. 5b and 6b is referred to as a high speed transfer process and the processing in accordance with FIG. 7a is referred to as a low speed transfer process.

A preferred embodiment of the present invention is now explained.

Figure 8:
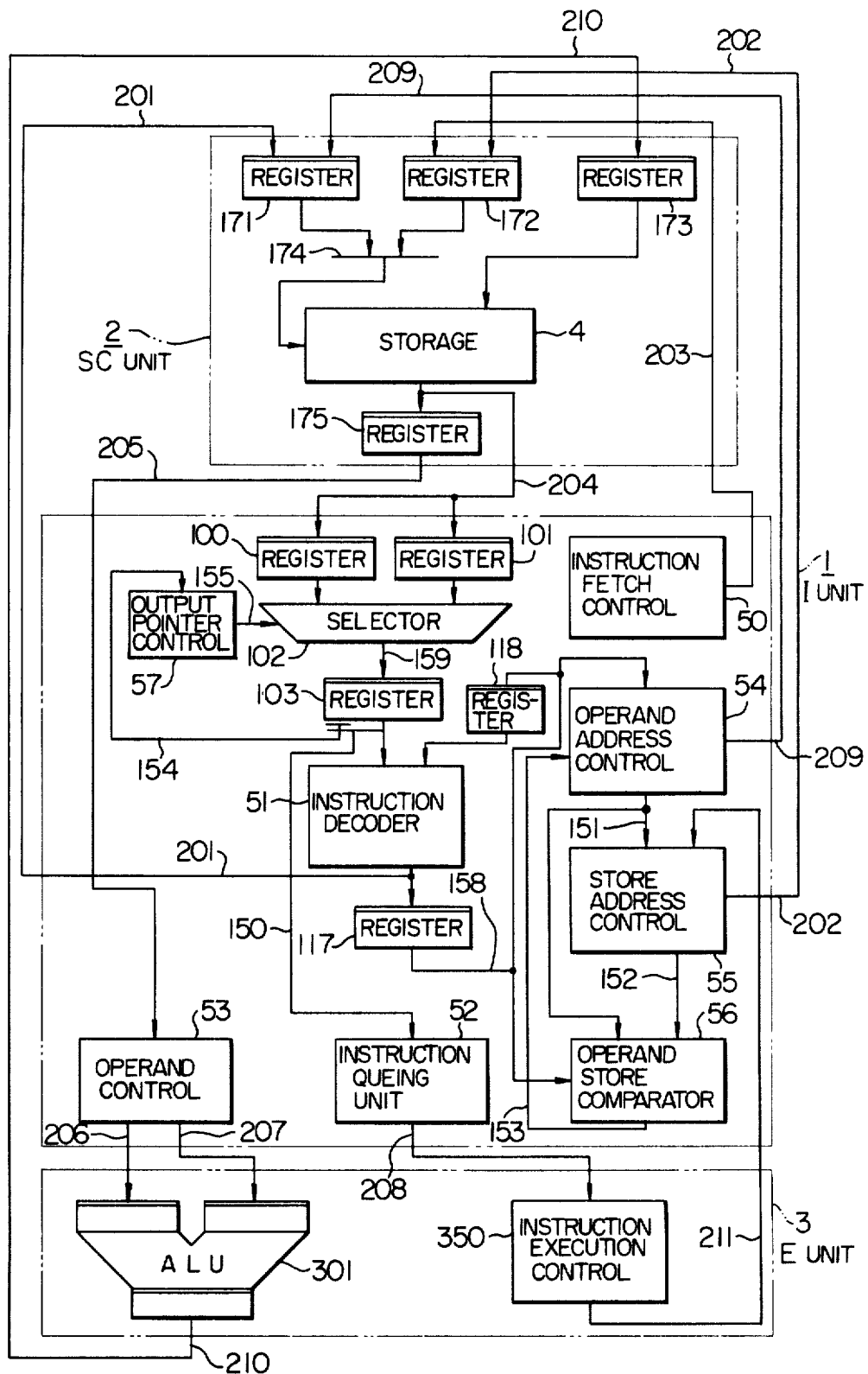
FIG. 8 shows a processor in accordance with the present invention.

FIG. 8 shows the detail of the data processor shown in FIG. 2. The processor may be an IBM Model 3033 processor. While those portions which are pertinent to the present invention are described in detail herein, reference may be made to the IBM 3033 maintenance library for the other portions. The SC unit 2 and the E unit 3 may be conventional ones. The execution operation of the instruction is outlined below with reference to FIG. 8. An instruction fetch control 50 in the I unit 1 loads an "instruction fetch" request which includes an instruction address into a register 172 in the SC unit 2 through a line 203. The instruction fetch control 50 has a well-known program counter which produces an address of the instruction to be next read. It may be a conventional program counter. The register 172 is an address register for a storage 4. The address is supplied to the storage 4 via a selector 174 so that the addressed instruction is read out. The fetched instructions are alternately loaded into registers 100 and 101 in the I unit 1. The selector 174 selects the registers 171 and 172 alternately for every half cycle. The storage 4 can read or write data in one half cycle.

Let us assume that instruction data is stored in an instruction buffer register 100. If an effective instruction to be decoded by the I unit 1 is not stored in an instruction buffer register 101, the instruction readout control 50 continues to issue the instruction fetch request to the SC unit 2 to read out the next instruction from the storage 4 and store it in the instruction buffer register 101. When the instruction forwarded to the register 100 has been executed, the next instruction is fetched and stored in the register 100. As described above, there are many different instruction formats and lengths. The registers 100 and 101 each contain a plurality of instructions. One of the instructions stored in the instruction buffer registers 100 and 101 is selected by a selector circuit 102 in response to a signal on an output line 155 of an output pointer control 57 and it is loaded into an instruction register 103. After the instruction has been loaded into the instruction register 103, a portion of the instruction is applied to the output pointer control 57 via a line 154. The signal on the line 154 indicates the length of the instruction loaded into the instruction register 103. In response to the signal on the line 154, the output pointer control 57 updates the pointer and produces the updated pointer on a line 155 to select the next instruction following the instruction loaded into the instruction register 103, from the instruction buffer registers 100 and 101.

As described above, the selector 102 and the pointer control 57 function to sequentially load the plurality of instructions stored in the registers 100 and 101 into the register 103. The details of this operation will be explained later.

An instruction decoder 51 decodes the instruction loaded into the instruction register 103 and calculates a storage operand address if a storage operand is needed. The decoded instruction information necessary for the execution of the instruction is supplied to an instruction queuing unit 52 via a line 150 and it is sent to an instruction execution control 350 in the E unit 3 via a line 208 just before the execution of the instruction. The instruction queuing unit 52 and the instruction execution control 350 are well known elements for performing the functions for executing microprograms. The instruction queuing unit 52 receives a signal derived by decoding an OP field of the instruction by the instruction decoder 51 to produce a leading address of a microprogram routine. Simply, it has counterparts of the signal on the line 150 and the leading address. The instruction execution control 350 has a control memory (not shown) for storing microprograms and sequentially reads out microinstructions from a specified address for execution, as is well known in the art.

The operand address calculated by the instruction decoder 51 is loaded in an address register 117 and is also applied via a line 201 to the register 171 which is used as the address register for the storage 4 in the SC unit 2. The storage operand is fetched from the storage 4 and it is sent to an operand control 53 in the I unit 1 via register 175 and a line 205. The operand control 53 latches the operand and it sends the storage operand or general purpose register operand (not shown) to an ALU 301 in the E unit 3 via lines 206 and 207 just before the execution of the instruction. The operand address loaded into the address register 117 is sent to an operand address (OA) control 54. If the operand address stored in the operand address control 54 is an address at which processed store data is to be stored in the storage, this address is sent to a store address (SA) control 55 via line 151. If the instruction executed by the E unit 3 is an instruction for data to be stored in the storage, the instruction execution control 350 orders the store address control 55 in the I unit 1 via a line 211 to issue a store request. When the store address control 55 receives this order, it sends the store address as well as the store request in the step E shown in FIG. 4 to a register 172 in the SC unit 2 via a line 202. The store data is processed in the ALU 301 and the result of the arithemetic operation is supplied to the register 173 in the SC unit 2 at the step P via a line 210. Since the transfer instruction needs no special arithmetic operation, it merely passes through the ALU 301. Numeral 56 denotes an operand store comparator (OSC). Since this matter is not important for the present invention, it is described merely for better understanding of the processor having the pipeline. Details of the operand store comparator 56 will be described later. The purpose thereof is now explained. Referring to FIG. 4a, it is assumed that the instruction a is an instruction to update the data in the storage 4, and the instruction b is an instruction for carrying out an arithmetic operation on the data updated by the instruction a. It is at the step E in the fourth cycle that a store request for updating the data in the storage by the instruction a is issued to the SC unit 2, and it is at the step W in the sixth cycle that the data in the storage is finally updated. On the other hand, it is at the step D in the second cycle that the instruction b issues the request for fetching the storage operand to the SC unit 2 and it is at the step L in the fourth cycle that the storage operand is fetched from the storage 4. As a result, the instruction b would fetch the storage operand which has not yet been updated by the instruction a. In this case, it is necessary to supply a request for refetching the storage operand by the instructions b to the SC unit 2 in the fifth cycle to enable the fetching of the correct storage operand in the seventh cycle. The operand store comparator 56 is provided to detect such a condition. Referring to FIG. 8, the operand store comparator 56 compares the operand address (line 151) stored in the operand address control 54 and the store address (line 152) stored in the store address control 55 with the content of the address register 117 for equality. If they are equal, it indicates that the error condition as described above takes place. Accordingly, if they are equal and hence the storage operand has to be fetched again from the storage, the operand store comparator 56 orders the fetching of the storage operand to the operand address control 54 via line 153 when the request for storing the data in the storage is issued to the SC unit 2. The operand address control 54 issues the request for fetching the storage operand to the register 171 in the SC unit 2 so that the correct data having been updated can be fetched.

The general configuration of the pipeline control has been described. Now referring to FIG. 9, the selector 102 and the output pointer control 57 are explained.

In the present embodiment, the instruction buffer registers 100 and 101 each can store 8-byte instruction data. The instructions used in the information handling system have lengths of 2 bytes, 4 bytes and 6 bytes. Typical examples of 2-byte, 4-byte and 6-byte length information formats are shown in FIGS. 1a, 1b and 1c, respectively. The length of the instruction can be identified by the high order two bits i.e. bit-0 and bit-1 in the OP field of the instruction. When the bit-0 and bit-1 of the OP field are [0, 0], the instruction is of 2-byte length, when they are [0, 1] or [1, 0], it is of 4-byte length, and when they are [1, 1] it is of 6-byte length. The instruction register 103 is a 4-byte register in which data is read out four bytes at a time. Assuming that effective instruction data is stored in the instruction buffer register 100 and the bits 0-2 on the output pointer line 155 are [000], the line 160 in the selector 102 is activated (logical "1") and the four bytes, i.e. the bits 0-31 of the instruction buffer register 100 are selected and loaded to the instruction register 103. Simultaneously, the content of an output pointer A 130 is loaded into all output pointer B 131. The bits 0-1 of the OP field of the instruction loaded into the instruction register 103 are applied to the output pointer control 57 via line 154 and a table 299 is looked up. Depending on the result of the table lookup, either the line 156 or the line 157 is activated. Assuming that the instruction loaded into the instruction register 103 is a 2-byte length instruction, the bits 0–1 of the OP field are [00]. Thus the line 156 is activated to apply a constant "1" to one input of an adder 132. The content [000] of the output pointer B 131 is is applied to the other input of the adder 132. The resulting sum [001] is loaded into the output pointer A 130 and the line 161 in the selector 102 is activated by the line 155.

This indicates that the bits 0–15 in the instruction data are not used because the instruction to be executed loaded in the register 103 is of 2-byte length and the next instruction begins from the bit 16. Accordingly, the four bytes ranging from the bit 16 to the bit 47 are read out for the next process. Thus, the next instruction, that is, the bits 16–47 of the instruction buffer register 100 are selected, and after the instruction loaded in the instruction register 103 has been decoded, the selected data is loaded into the instruction register 103. At the same time the content [001] of the output pointer A 130 is loaded into the output pointer B 131. If the instruction loaded into the instruction register 103 is a 4-byte length instruction, the bits 0–1 of the OP field are [01] or [10] so that the line 157 is activated to apply a constant "2" to one input of the adder 132. The content [001] of the output pointer B 131 is applied to the other input of the adder 132 and the resulting sum [011] is loaded into the output pointer A 130. The content thereof is sent to the selector 102 via line 155 to activate the line 163. Thus, the next instruction, i.e. the bits 48–63 of the instruction buffer register 100 and the bits 0–15 of the instruction buffer register 101 are selected and the selected data is loaded into the instruction register 103 when the instruction now stored in the instruction register 103 has been decoded. As a result, the instruction data stored in the instruction buffer register 100 is all unnecessary any more and the instruction fetch control 50 issues a fetch request for the next instruction data following the instruction data being stored in the instruction buffer register 101, to the SC unit 2 and stores the instruction data read from the storage 4 in the instruction buffer register 100. Now let us assume that the instruction loaded into the instruction register 103 is a 6-byte length instruction as shown in the format of FIG. 1c. Since the instruction register 103 is a four-byte register, the instruction is loaded into the instruction register 103 in two cycles. In the first cycle, the first half four bytes consisting of OP, L, $B_1$ and $D_1$ fields are loaded. The bits 0–1 of the OP field are [11]. Thus, in the first cycle, the line 156 is activated and the constant "1" is applied to the one input of the adder 132. The content [011] of the output pointer B 131 is applied to the other input of the adder 132. The resulting sum [100] is loaded into the output pointer A 130 and the line 164 in the selector 102 is activated by the line 155. As a result, the bits 0–31 in the instruction buffer register 101 are selected, and after the 6-byte length instruction now being stored in the instruction register 103 has been decoded and the first operand address has been calculated, only the second half two bytes of the selected data are loaded into the second half two bytes (bits 16–31) positions of the instruction register 103. As a result, the fields $B_1$ and $D_1$ are replaced by the field $B_2$ and $D_2$. At the same time, the content (100) of the output pointer A 130 is loaded into the output pointer B 131. When the second half two bytes of the 6-byte length instruction are loaded into the instruction register 103, the line 157 is activated by the line 154 and the constant "2" is applied to the one input of the adder 132. The content [100] of the output pointer B 131 is applied to the other input of the adder 132 and the resulting sum [110] is loaded into the output pointer A 130. The content thereof is supplied via the line 155 into activate to the line 166 in the selector 102. As a result, the bits 32–63 of the instruction buffer register 101 are selected and the selected data is loaded into the instruction register 103 after the 6-byte length instruction now being stored in the instruction register 103 has been decoded. Through those operations, the instructions of different lengths are sequentially fetched to the register 103.

Figure 9:
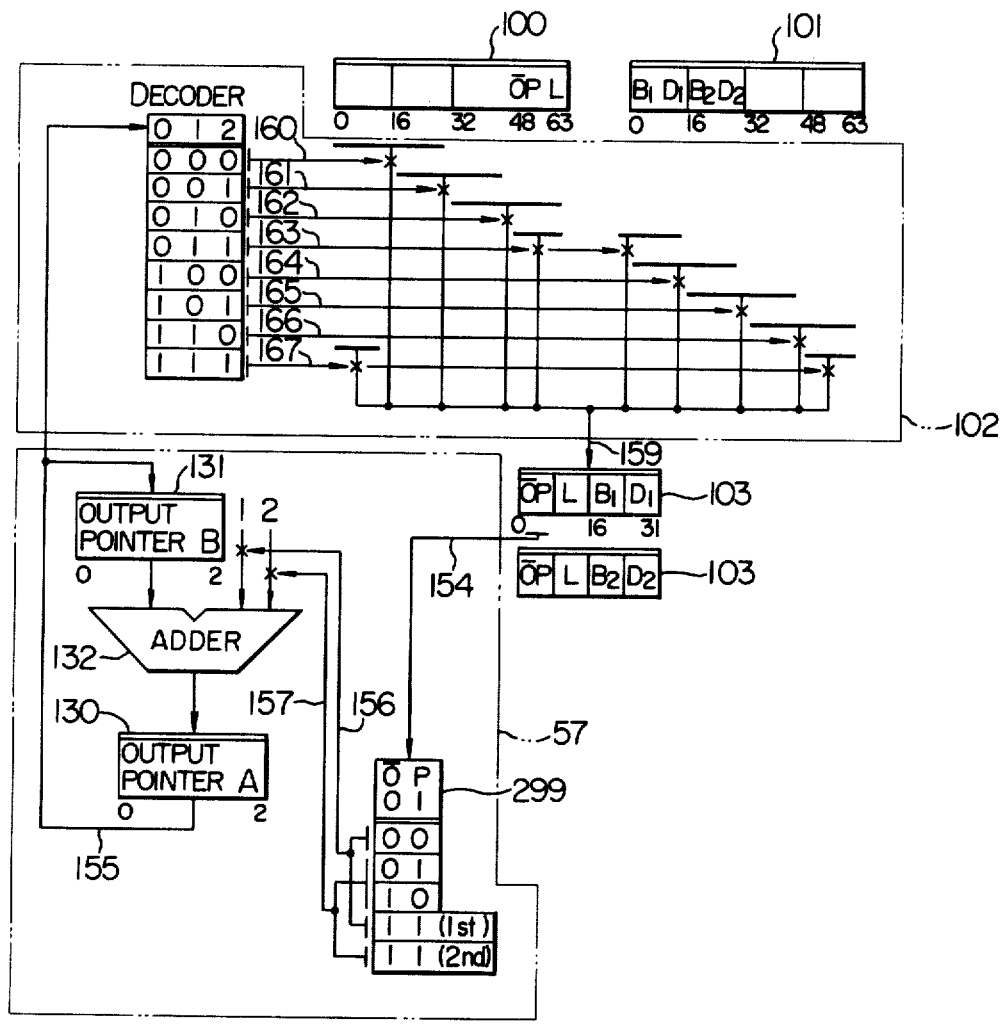
FIG. 9 shows detail of a pointer control circuit and a selector shown in FIG. 8.
Figure 10:
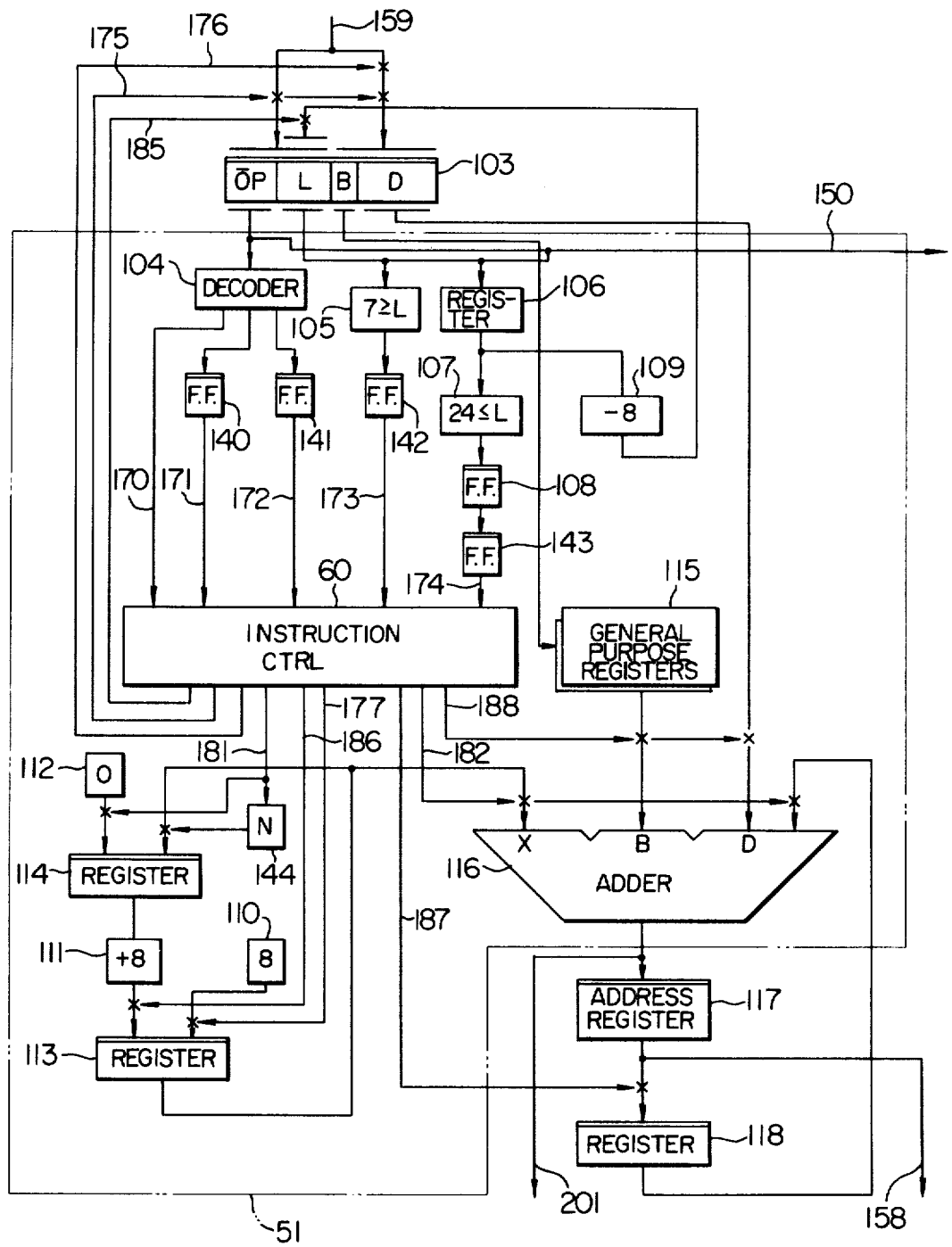
FIG. 10 shows detail of an instruction decoding unit shown in FIG. 8.
Figure 12A:
FIGS. 12a through 12d show logics for the instruction control unit shown in FIG. 11.
Figure 12B:
Figure 12C:
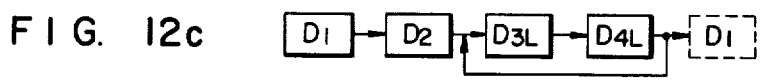
Figure 12D:
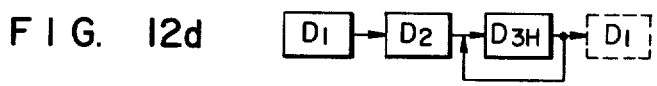

FIG. 10 illustrates further details of the instruction decoder 51 shown in FIG. 8. An instruction selected by the selector 102 shown in FIG. 9 is loaded into the instruction register 103 through the line 159. The OP field of the instruction register 103 is applied to the instruction decoder 104 for decoding. When the instruction decoder 104 decodes the fact that an operand address calculation by the B field and D field is necessary, it activates the line 170 which is connected to the instruction control 60. If the instruction is a 6-byte length instruction, a flip-flop 140 is set to "1", and if the instruction is a transfer instruction, a flip-flop 141 is set to "1". The flip-flops 140 and 141 are connected to the instruction control 60 via lines 171 and 172, respectively. The L field of the instruction register 103 is connected to a completion determination circuit 105 which determines if the value in the L field is greater than 7 or not, and if it is not greater than 7 the circuit 105 sets a flip-flop 142 to "1". An output line 173 of the flip-flop 142 is connected to the instruction control 60. The L field of the instruction register 103 is also connected to an L register 106 which stores the value of the L field. The L register 106 is connected to a determination circuit 107 and a subtractor 109. The determination circuit 107 determines if the L value stored in the L register 106 is smaller than 24 or not, and if it is not smaller than 24 the circuit 107 sets a flip-flop 108 to "1" and sets a flip-flop 143 to "1". An output line 174 of the flip-flop 143 is connected to the instruction control 60. The subtractor 109 subtracts eight from the content of the L register 106. An output of the subtractor 109 is applied to the input of the L field of the instruction register 103. The B field of the instruction register 103 is connected to a set of general purpose registers 115 to select one general purpose register, an output of which is applied to a B input of an address adder 116. The D field of the instruction register 103 is connected to a D input of the address adder 116. Connected to a register 114 are a constant "0" circuit 112 and an increment register 113, one of which is selectively loaded into the register 114. The constant "0" circuit 112 produces a constant "0". The register 114 is connected to an adder 111 which adds eight to the content of the register 114. The adder 111 and a constant "8" circuit 110 are connected to the increment register 113, and either one of them is selectively loaded into the increment register 113. The increment register 113 is also connected to an X input of the address adder 116. The address adder 116 has three inputs X, B and D and adds the values of those three inputs together. The resulting sum is loaded into an address register 117 and also is supplied to the SC unit via line 201 for use as a fetch address for a storage operand. An output of the address register 117 is connected to a register 118, the output of which is connected to the D input of the address adder 116 as a second D input. The output of the address register 117 is supplied to the operand address control 54 and the operand store comparator 56 via line 158.

The instruction control 60 has input lines 170–174 and produces various control signals. A line 175 produces a control signal to load the 4-byte instruction data on the line 159 selected by the selector 102 into the instruction register 103. A line 176 produces a control signal to load the right two bytes of the 4-byte instruction data on the line 159 into the B and D fields of the instruction register 103. A line 185 produces a control signal to load the content of the L register 106 less eight (the subtraction being carried out by the subtractor 109) into the L field of the instruction register 103. A line 181 produces a signal to select one of two inputs to the register 114, i.e. the constant "0" circuit 112 and the increment register 113. It selects the constant "0" circuit 112 when the line 181 is "1", and selects the increment register 113 by an inverting gate 144 when the line 181 is "0" and loads the selected content into the register 114. A line 186 produces a control signal to load the content of the register 114 plus eight (the addition being carried out by the adder 111) into the increment register 113. A line 177 produces a control signal to load the content of the constant "8" circuit 110 into the increment register 113. Lines 188 and 182 produce signals to select input data to the address adder 116, the line 188 producing a signal to select the content of the general purpose register specified by the B field of the instruction register 103 or the content of the D field of the instruction register 103 and apply it to the B input or the D input of the address adder 116. The line 182 produces a signal to select the content of the increment register 113 or the content of the register 118 and apply it to the X input or the D input of the address adder 116. A line 187 produces a control signal to load the content of the address register 117 into the register 118.

FIGS. 11 and 12 show further details of the instruction control 60, in which the $D_1$ flip-flop 600, $D_2$ flip-flop 601, $D_{3L}$ flip-flop 602, $D_{4L}$ flip-flop 603 and $D_{3H}$ flip-flop 604 discriminate the D cycle. The flip-flops 600–604 are connected to flip-flops 605–609, respectively, through lines 180–184, respectively so that the contents of the flip-flops 600–604 are loaded into the flip-flops 605–609, respectively, one half machine cycle later. An instruction control circuit 610 receives inputs from the flip-flops 605–609 and inputs through lines 171–174 and produces outputs on lines 175–179 to set the flip-flops 600–604, respectively. The operation of the instruction control circuit 610 is explained with reference to FIGS. 12a to 12d. The instruction on the line 159 is loaded into the instruction register 103 in response to the line 175 and the $D_1$ flip-flop 600 is set simultaneously. If the instruction now being stored in the instruction register 103 is a 2-byte or 4-byte length instruction which needs only one D cycle, the succeeding instruction is loaded into the instruction register 103 in response to the line 175 after the process in the D cycle (instruction decode and, if necessary, operand address calculation) has completed, and the $D_1$ flip-flop 600 is set to start the process of the D cycle for the succeeding instruction (FIG. 12a). FIG. 12b illustrates a case where the instruction is a 6-byte length instruction other than the transfer instruction. When the instruction decode and the first operand address calculation have been completed in the first D cycle (during which the $D_1$ flip-flop 600 is ON), the line 176 is activated by the line 171 and the remaining two bytes of the current instruction are loaded into the right two bytes (B and D fields) of the instruction register 103 and the $D_2$ flip-flop 601 is set (the $D_1$ flip-flop 600 being reset simultaneously) to start the second D cycle. When the process in the second D cycle has been completed, the succeeding instruction is loaded into the instruction register 103 in response to the line 175 and the $D_1$ flip-flop 600 is set to start the process of the D cycle for the succeeding instruction. FIG. 12c illustrates the low speed process for the transfer instruction. When the process in the second D cycle (during which the $D_2$ flip-flop 601 is ON) has been completed, the status of the lines 172, 173 and 174 are examined. If the line 172 is "1" and the line 173 is "1", the line 175 is activated, as is done in the case of FIG. 12b, to start the process of the first D cycle for the succeeding instruction. If the line 172 is "1", the line 173 is "0" and the line 174 is "0", the line 177 is activated and the $D_{3L}$ flip-flop 602 is set (the $D_2$ flip-flop 601 being reset simultaneously) to start the process of the third D cycle. When the process in the third D cycle has been completed, the $D_{4L}$ flip-flop 603 is set in response to the line 178 (the $D_{3L}$ flip-flop 602 being reset simultaneously) to start the process of the fourth D cycle. When the process in the fourth D cycle has been completed and if the line 173 is "0", the line 177 is again activated and the $D_{3L}$ flip-flop 602 is set to start the fifth D cycle. If the process of the D cycle is completed with the $D_{3L}$ flip-flop 602 being ON, the $D_{4L}$ flip-flop 603 is set to start the process of the sixth D cycle. When the process in the sixth D cycle (during which the $D_{4L}$ flip-flop 603 is ON) has been completed, the status of the line 173 is again examined. If the line 173 is "0" the $D_{3L}$ flip-flop 602 is again set and the similar operation to that described above is repeated. If the line 173 is "1" when the process in the D cycle has been completed with the $D_{4L}$ flip-flop 603 being ON, the line 175 is activated and the succeeding instruction is loaded into the instruction register 103 and the $D_1$ flip-flop 600 is set to start the process of the D cycle for the succeeding instruction. FIG. 12d illustrates the high speed process for the transfer instruction. When the process in the second D cycle (during which the $D_2$ flip-flop 601 is ON) has been completed, the line 179 is activated by the instruction from the line 174 (which is "1" at this time) and the $D_{3H}$ flip-flop 604 is set to start the process of the third D cycle. When the process in the third D cycle has been completed, the status of the line 173 is examined, and when it is "0" the line 179 is again activated and the $D_{3H}$ flip-flop 604 is set to start the process of the fourth D cycle. When the process in the fourth D cycle has been completed, the status of the line 173 is again examined. If it is "0", the $D_{3H}$ flip-flop 604 is again set. The above operation is repeated until the status of the line 173 becomes "1". When the status of the line 173 finally becomes "1", the line 175 is activated and the succeeding instruction is loaded into the instruction register 103 and the $D_1$ flip-flop 600 is set to start the process of the D cycle for the succeeding instruction. An OR circuit 611 ORs the line 177 and the line 179 and produces a logical OR output on a line 185. An OR circuit 612 ORs the line 178 and the line 179 and produces a logical OR output on a line 186. An OR circuit 613 ORs the line 176 and the line 178 and produces a logical OR output on a line 187. An AND circuit 614 ANDs the line 170 and the line 180. An OR circuit 615 ORs the output of the AND circuit 614 and, the lines 180, 181, 183 and 184 and produces a logical OR output on a line 188.

Figure 13:
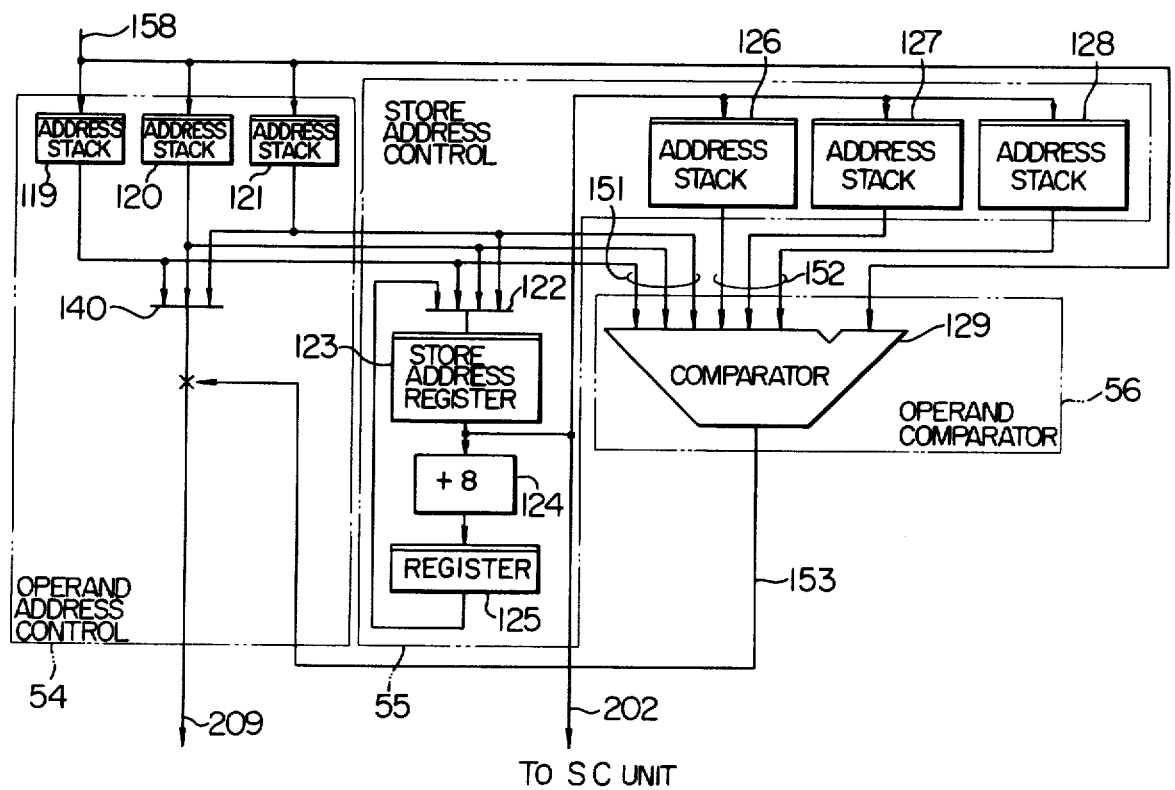
FIG. 13 shows in detail an operand control unit, a store address control unit and an operand compare unit shown in FIG. 8.

FIG. 13 shows details of the operand address control 54, the store address control 55 and the operand store comparator 56. The operand addresses in the address register 117 are sequentially loaded into operand address stacks 119, 120 and 121. The addresses in those stacks are loaded into a store address register 123 through the selector 122. When the given operand address is a store address it is supplied to the SC unit 2 as the store address through a line 202. When it is a transfer instruction having 24 bytes or more, the address in the register 123 is supplied to the adder 124 which adds eight, which is equal to the number of bytes transferred at a time, to the address and the sum is loaded into the register 125.

The address stored in the register 125 is selected by the selector 122 in the second and subsequent transfer and loaded into the register 123 as a new store address. This operation is carried out in the E cycle just before the transfer of the store address to the SC unit 2. Whether the adder 124 is to be operated or not is determined by checking the contents of the OP field and the L field of the register 103. In one approach, the instruction execution control 350 is provided with a microprogram step to add eight to the content of the register 123 and the instruction queing unit 52 is provided with an OP field decoder (not shown) and a circuit (not shown) for determining if the content of the L field is equal to or larger than 24. When the transfer instruction of 24 bytes or longer is determined, the above steps are selected. The addresses in the register 123 are sequentially latched in the stacks 126, 127 and 128.

As explained in conjunction with FIG. 8, if the store address of the current instruction and the fetch address of the succeeding instruction are equal, the data at that address would be erroneously fetched before the data is stored at that address. The operand store comparator 56 detects such a situation. The operand address from the line 158 is supplied to one input of a compare circuit 129 while the contents of the address stacks 119, 120, 121, 126, 127 and 128 are supplied to the other input, and the contents of the address stacks are compared with the address from the line 158. If the address supplied from the line 158 is a fetch address and a store address corresponding to that fetch address is contained in the stacks, erroneous fetching would occur. Accordingly, depending on the compare result on the line 153, a refetch address is supplied to the SC unit 2 via line 209 to carry out the refetch. In the high speed process of the present invention, the store address for the last transfer operation by the transfer instruction is undefined till the step E for that instruction. Accordingly, the comparison of the operand address of the instruction following the transfer instruction cannot be carried out until the address is generated and latched into one of the stacks 126, 127 and 128. For this reason, the step D for the instruction following the transfer instruction starts after the step E for the last transfer, as shown in FIG. 7b.

The operation for the transfer instruction is now explained in accordance with the construction described above. The transfer instruction which was selected from the instruction buffer registers 100 and 101 in which a plurality of instructions are stored, by the output pointer A 155 is loaded into the instruction register 103 in response to the line 175 shown in FIG. 11. The $D_1$ flip-flop 600 is set at the same time. If the instruction decoder 104 determines from the OP field of the instruction register 103 that the instruction is a transfer instruction, the line 170 is activated and it is ANDed with the output line 180 of the $D_1$ flip-flop 600 by the AND circuit 614, an output of which is applied to the OR circuit 615 which produces an output on the line 188. The signal on the line 188 causes one general purpose register in the set of general purpose registers 115 selected by the B field of the instruction register 103, and the D field of the instruction register 103 to be supplied to the B input and the D input, respectively, of the address adder 116. Since the transfer instruction is a 6-byte instruction, the instruction decoder 104 sets the flip-flop 141. The sum of the B input and the D input of the address adder 116 is stored in the address register 117. The content thereof represents the first operand address $\{(B_1)+D_1\}$ for the transfer instruction. The content of the address register 117 is stored in one of the address stacks 119-121 via the line 158. Let us assume that it it stored in the address stack 119. When the calculation of the first operand address $\{(B_1)+D_1\}$ is completed in the step D in the first cycle, the line 176 shown in FIG. 11 is activated by the output line 171 of the flip-flop 140 and the first operand address is loaded into the register 118 by the output line 187 of the OR circuit 613. The signal on the line 176 causes the right two of data on the line 159 selected from the $B_2$ and $D_2$ field of the transfer instruction in the instruction buffer registers 100 and 101 by the selector 102, to be loaded into the B and D fields of the instruction register 103. The $D_2$ flip-flop 601 is set at the same time to start the second D cycle. The signal on the output line 181 of the $D_2$ flip-flop 601 activates the line 188 via the OR circuit 615. The signal on the line 188 causes the second operand address $\{(B_2)+D_2\}$ to be calculated by the address adder 116 by the $B_2$ and $D_2$ fields stored in the $B_2$ and $D_2$ fields of the instruction register 103, in the same manner as described above. The resulting address is loaded into the address register 117 and also is sent to the SC unit via the line 201 to cause the second operand to be fetched from the storage 4. The second operand address loaded into the address register 117 is then loaded into the address stack 120.

The SC unit fetches the second operand by the second operand address $\{(B_2)+D_2\}$ and the second operand is supplied to the E unit in the step L in the fourth cycle and data to be written into the storage is prepared in the step E in the fifth cycle. At the beginning of the step E of the fifth cycle, the first operand address stored in the address stack register 119 is loaded into the store address register 123 through the select gate 122, and the content of the store address register 123 is supplied to the SC unit 2 via the line 202 at the step E in the fifth cycle for use as the store address for the storage. The store data prepared in the E unit at the step E in the fifth cycle is supplied to the SC unit at the step P in the sixth cycle and is written into the storage at the step W in the seventh cycle. In this manner the first eight bytes of data for the transfer instruction are transferred from the second operand address to the first operand address.

As explained before, the L field of the transfer instruction contains the number which is equal to the number of bytes to be transferred less one. Accordingly, if the value of the L field is no greater than 7, the process for the transfer instruction is completed in one transfer operation, but if the value of the L field is equal to or greater than 8, the process for the transfer instruction does not end in one transfer operation. Accordingly, in the step D in the second cycle the second operand address is calculated as described above and the following operation is carried out simultaneously.

The completion determination circuit 105 determines if the value in the L field of the instruction register 103 is greater than 7 or not, and if it is no greater than 7, the flip-flop 142 is set to set the output line 173 thereof to "1". By the signal on the line 173 the instruction control circuit 610 detects the completion of the process in the step D for the transfer instruction and activates the line 175 to select the instruction following the transfer instruction from the instruction buffer registers 100 and 101 by the selector 102 and to load it into the instruction register 103. If the value of the L field of the instruction register 103 is equal to or greater than 8, the determination circuit 107 determines if the content of the L register 106, which contains the value of the field of the instruction register 103, is greater than 23 or not, and if it is equal to or greater than 24 the flip-flops 108 and 143 are set. The subsequent operation differs depending on whether the value L is no greater than 23 or greater than 23.

Let us first consider a case where the value of L is no greater than 23. The operation for this case is the same as the prior art system and follows the time chart shown in FIG. 7a. In the step D in the second cycle, the instruction control 60 selects the input of the constant circuit 110 and loads eight into the increment register 113. At the step D in the third cycle, the first operand address $\{(B_1)+D_1\}$ calculated in the step D in the first cycle and stored in the register 118 is supplied to the D input of the address adder 116, and the content of the increment register 113 is applied to the X input of the address adder 116 to calculate the first operand address $\{(B_1)+D_1+8\}$ which is the second store address. The result is loaded into the address register 117 as in the case of the process at the step D in the first cycle, and then it is loaded into the register 118. The content of the address register 117 is also loaded into the address stack 121. At the step D in the fourth cycle, the second operand address $\{(B_2)+D_2+8\}$ for the second operation is calculated by the address adder 116 in accordance with the content of one general purpose register in the set of general purpose registers 115 specified by the B field of the instruction register 103, the content of the D field of the instruction register 103 and the content of the increment register 113. The result is loaded into the address register 177 and also is sent to the SC unit via the line 201 to cause the second operand data to be fetched. The content of the address register 117 is loaded into the address stack 119. Similarly, the second operand for the second operand address for the second operation which was calculated at the step D in the fourth cycle and supplied to the SC unit is prepared as the second store data by the E unit at the step E in the seventh cycle, and the first operand address $\{(B_1)+D_1+8\}$ which is the second store address and stored in the address stack 121 is loaded into the address register 123 and also is sent to the SC unit via the line 202. At the step P of the eighth cycle, the second store data is sent from the E unit to the SC unit and it is written into the storage at the step W of the ninth cycle. At the step D of the fourth cycle, the second operand address for the second operation is calculated and the completion determination circuit 105 determines if the value of the L field of the instruction register 103 is greater than 7 or not. If the value of the L field is equal to or greater than 8, the above operation is repeated until the value of the L field becomes no greater than 7. For example, if the value L of the transfer instruction is equal to 23, the above operation is repeated three times so that the value L reaches 7. At the step D of the sixth cycle the completion determination circuit 105 detects the completion of the process at the step D for the transfer instruction. Then, the instruction decoder 104 selects the instruction following the transfer instruction from the instruction buffer registers 100 and 101 and loads it into the instruction register at the beginning of the step D of the seventh cycle to start the process for that instruction.

Let us now consider a case where the value L of the transfer instruction is equal to or greater than 24. The operation for this case follows the high speed transfer process in accordance with the time charts shown in FIGS. 5b and 6b. The first write operation is essentially same as the operation for the value L being no greater than 23, except for the following operation. At the step D of the second cycle, the determination circuit 107 detects that the value L is equal to or greater than 24 and sets the flip-flop 108. When the flip-flop 108 is set, the instruction control 60 performs the high speed transfer process. At the step E of the fifth cycle, the first operand address $\{(B_1)+D_1\}$ which is the first store address is loaded into the store address register 123 shown in FIG. 13 and the content thereof is supplied to the SC unit via the line 202. Eight is added to the content of the store address register 123 by the adder 124 and the result is loaded into the register 125, as opposed to the case for the value L of no greater than 23. In the high speed transfer process, since the first operand address which is the store address for the second and subsequent operations is not calculated at the step D, the next store address is calculated by the adder 124 and the register 125 at the step E. At the step D of the third cycle, the operation is the same as that at the step D of the fourth cycle for the case of the value L of no greater than 23, that is, the second operand address $\{(B_2)+D_2+8\}$ which is the second fetch address is calculated. The result is supplied to the SC unit and the fetched second operand is transferred to the E unit at the step L of the fifth cycle. It is prepared as the second store data by the E unit at the step E of the sixth cycle and the second store address calculated by the adder 124 at the step E of the fifth cycle is loaded into the store address register 123 from the register 125 at the beginning of the sixth cycle. It is then supplied to the SC unit via the line 202. At the step P of the seventh cycle the second store data is supplied to the SC unit from the E unit and it is stored in the storage at the step W of the eighth cycle. At the step D of the third cycle, eight is added to the content of the increment register 113 (which now contains eight) by the register 114 and the adder 111, and the result is loaded into the increment register 113 at the beginning of the step D of the fourth cycle. At the step D of the third cycle, the content of the L field of the instruction register 103 (which now contains the initial value less eight) is loaded into the L register 106, the content of which is decremented by eight by the subtractor 109 and the result is loaded into the L field of the instruction register 103 at the beginning of the step D of the fourth cycle. At the step D of the fourth cycle, the operation is the same as that at the step D of the third cycle. The above operation is repeated until the value of the L field of the instruction register 103 becomes no greater than 7.

Assuming that the value L of the transfer instruction is 31 (total number of bytes to be transferred being 32), the value L of the instruction register 103 becomes no greater than 7 at the step D of the fifth cycle. Thus, at the end of the process at the step D of the fifth cycle, the instruction decoder 104 detects the completion of the process at the step D for the transfer instruction and selects the instruction following the transfer instruction from the instruction buffers 100 and 101 by the selector 102 and loads it into the instruction register 103. In this case (high speed transfer process), however, as shown in FIG. 5b, the process at the step D cannot be started from the sixth cycle but it starts from the ninth cycle. That is, the process at the step D for the succeeding instruction starts from the cycle next to the cycle in which the last process at the step E for the transfer instruction was processed. This also applies to the case where the value L is equal to or greater than 32 as shown in FIG. 6b. The reason for the above is explained below with the comparison between the operations of the present system and the prior art system.

If the instruction following the transfer instruction is an instruction which requires a storage operand, the storage operand for the succeeding instruction may be updated by the transfer instruction. If the transfer instruction updates the storage operand for the succeeding instruction, the succeeding instruction must use the updated data for the arithmetic operation. To this end, it is necessary to determine if the storage operand for the succeeding instruction is updated by the preceding instruction or not. The compare circuit 129 shown in FIG. 13 is provided for this purpose. Referring to FIG. 5b, an example is explained where the storage operand for the succeeding instruction B is updated by the last store operation for the transfer instruction A.

FIG. 5b shows the time chart for the case where the value L of the transfer instruction is equal to 31. In this high speed transfer process, the store address for the second and subsequent operations for the transfer instruction A is not calculated at the step D. Accordingly, the last store address for the transfer instruction is not loaded into the address stacks 119-121, and at the step E of the eighth cycle the last store address is loaded into the address register 123 and the content thereof is then loaded into one of the store address stacks 126-218. Let us assume that it is loaded into the address stack 126. If the step D for the succeeding instruction B starts from the sixth cycle which is next to the cycle in which the process at the step D for the transfer instruction A completed, the compare circuit 129 cannot carry out the comparison at this time because the last store address for the transfer instruction A has not yet been loaded into the store address stack 126. Accordingly, in the high speed transfer process, the step D for the succeeding instruction B starts from the ninth cycle by which the last store address for the transfer instruction A has been loaded into the store address stack 126.

The preferred embodiment of the present invention has been shown and described. In the illustrated embodiment, the first operand address for the second and subsequent transfer operations is calculated at the step E. Since the hardware for calculating the first operand address is separately provided, the first and second operand addresses for the second and subsequent operations may be calculated at the step D. In this case, however, since the first operand address, that is, the store address is used at a later time and the first and second operand addresses are generated simultaneously, the registers cannot be efficiently used and the register having more stacks for the addresses than the prior art system is needed. On the other hand, the start of the step D for the instruction following the transfer instruction need not be delayed. The choice of the above alternative depends on whether a designer puts more weight on the reduction of the hardware or on the processing speed.

I claim:

1. In a data processing system capable of pipeline operation for parallelly executing instructions each consisting of a plurality of process steps including an operand address calculation step, said pipeline operation including the execution of a transfer instruction having a first operand field, a second operand field and a field (L) specifying the number of bytes to be transferred, wherein the transfer is carried out in a plurality of transfer operations, sequentially, such that a predetermined number of bytes are transferred at each transfer operation including first calculation means for calculating a second operand address in said operand address calculation step based on said second operand field; the improvement comprising:

second calculation means operating independently of the operation of said first calculation means for calculating a first operand address based only on the first operand field in a process step other than said operand address calculation step.

2. In a data processing system capable of pipeline operation for parallelly executing instructions each consisting of a plurality of process steps including an operand address calculation step, said pipeline operation including the execution of a transfer instruction having a first operand field, a second operand field and a field (L) specifying the number of bytes to be transferred by transferring the bytes specified in said L field sequentially at a plurality of times with a predetermined number of bytes being transferred each time from storage locations starting from an operand address specified by the second operand to storage locations starting from an operand address specified by the first operand, including first calculation means for calculating a respective first and second operand address for each of said first and second operand fields in said operand address calculation step and for calculating a further second operand address which is said predetermined number higher per transfer than said calculated operand address based on said second operand field; the improvement comprising:

second calculation means operating independently of the operation of said first calculation means for calculating a further first operand address in a processing step other than said calculation step which is said predetermined number higher per transfer than said first operand address calculated by said first calculation means based on said first operand field.

3. A data processing system according to claim 1 further comprising;

detection means for detecting from said L field if said number of bytes to be transferred is larger than a predetermined number;

said second calculation means being responsive to said detection means to operate only when said number of bytes to be transferred is larger than said predetermined number for calculating said first operand address.

4. A data processing system according to claim 2 further comprising;

detection means for detecting from said L field if said number of bytes to be transferred is larger than a predetermined number;

said second calculation means being responsive to said detection means to operate only when said number of bytes to be transferred is larger than said predetermined number for calculating said first operand address.

5. A data processing system according to claim 2 or 4 further comprising;
   a plurality of general purpose registers;
   said first operand field and said second operand field each having a first portion for specifying one of said general purpose registers and a second portion for specifying a displacement;
   said first calculation means including means for calculating said operand address specified by said operand field by adding said displacement to the content of said one general purpose register specified by said first portion.

6. In a data processing system for executing a transfer instruction having a first operand field, a second operand field and a field (L) for specifying the number of bytes to be transferred and including a plurality of means adapted to operate independently of each other for executing different processing steps at the same time, said plurality of means comprising:
   a storage;
   first calculation means for calculating a second operand address based on said second operand field;
   means responsive to said second operand address to table-look-up a buffer storage;
   means responsive to said table look-up means for fetching an operand at said table-looked-up address from said storage;
   means for executing a process using said fetched operand;
   means for transferring the execution result of said executing means to said storage; and
   means for storing the transferred data in said storage at a storage location designated by a first operand address based on said first operand field; the improvement comprising:
   second calculation means operative independently of said first calculation means for calculating said first operand address relating to the instruction executed by said executing means.

7. In a data processing system responsive to a transfer instruction having a first operand field, a second operand field and a field (L) for specifying the number of bytes to be transferred for transferring a number of data bytes specified by said L field at a time, from storage locations starting from a second operand address specified by the second operand field to storage locations starting from a first operand address specified by the first operand field of the transfer instruction, and including a plurality of means operative independently of each other for executing different process steps at the same time, said plurality of means comprising:
   a storage;
   first calculation means for calculating said second operand address;
   means responsive to said second operand address to table look-up a buffer storage;
   means responsive to said table look-up means for fetching an operand at said table looked-up address from said storage;
   means for executing a process using said fetched operand;
   means for transferring the execution result of said executing means; and
   means for storing the transferred data in said storage at a stroage location designated by said first operand address; an improvement which comprises;
   said first calculation means including means for calculating said first and second operand addresses specified by said first and second operand fields and further means for calculating a further second operand address which is greater than said calculated second operand address by the number of data bytes transferred at a time; and
   second calculation means independent of said first calculation means for calculating a further first operand address which is greater than said first operand address calculated by said first calculation means by the number of data bytes transferred at a time.

8. A data processing system according to claim 6 further comprising;
   detection means for detecting from said L field if said number of bytes to be transferred is larger than a predetermined number;
   said second calculation means being responsive to said detection means to operate only when said number of bytes to be transferred is larger than said predetermined number for calculating said first operand address.

9. A data processing system according to claim 7 further comprising;
   detection means for detecting from said L field if said number of bytes to be transferred is larger than a predetermined number;
   said second calculation means being responsive to said detection means for operating only when said number of bytes to be transferred is larger than said predetermined number for calculating said further first operand address.

10. A data processing system according to claim 7 or 9 further comprising;
    a plurality of general purpose registers;
    said first operand field and said second operand field each having a first portion for specifying one of said general purpose registers and a second portion for specifying a displacement;
    said first calculation means calculating the operand address specified by said operand field by adding said displacement to the content of said one general purpose register specified by said first portion.

11. In a data processing system for executing a transfer instruction having a first operand field, a second operand field and a field (L) for specifying the number of bytes to be transferred, the improvement comprising;
    first calculation means for calculating first and second operand addresses based on said first and second operand field, respectively; and
    second calculation means operative independently of said first calculation means for calculating a further address based on said first operand address calculated by said first calculation means.

12. In a data processing system for executing a transfer instruction having a first operand field, a second operand field and a field (L) for specifying the number of bytes to be transferred by transferring a number of data bytes specified by said L field, a predetermined number of bytes at a time, from storage locations starting from a second operand address specified by the second operand field to storage locations starting from a first operand address specified by the first operand field, the improvement comprising;

first calculation means for calculating said first and second operand addresses specified by said first and second operand fields and for calculating a further second operand address which is said predetermined number higher per transfer than said calculated second operand address; and second calculation means operative independently of said first calculation means for calculating a further first operand address which is said predetermined number higher per transfer than said first operand address calculated by said first calculation means based on said first operand field.

13. A data processing system according to claim 12 further comprising;

a plurality of general purpose registers;

said first operand field and said second operand fields each having a first portion for specifying one of said general purpose registers and a second portion for specifying a displacement;

said first calculation means calculating said operand address by adding said displacement to the content of said one general purpose register specified by said first portion.

* * * * *